March 10, 1970 G. A. CANNALTE 3,500,458

TRANSMISSION TIME LIMITED TRANSMITTER

Filed Aug. 31, 1966 2 Sheets-Sheet 1

INVENTOR
GARY A. CANNALTE
By Mueller, Aichele & Rauner
Attys.

March 10, 1970 G. A. CANNALTE 3,500,458

TRANSMISSION TIME LIMITED TRANSMITTER

Filed Aug. 31, 1966 2 Sheets-Sheet 2

INVENTOR
GARY A CANNALTE
By Mueller, Aichele & Rauner
Attys.

United States Patent Office 3,500,458

Patented Mar. 10, 1970

3,500,458

TRANSMISSION TIME LIMITED TRANSMITTER

Gary A. Cannalte, Hoffman Estates, Ill., assignor to Motorola Inc., Franklin Park, Ill., a corporation of Illinois Filed Aug. 31, 1966, Ser. No. 576,377
Int. Cl. H04b *1/02*
U.S. Cl. 325—133 6 Claims

ABSTRACT OF THE DISCLOSURE

Timing circuit for use with transmitter to limit the maximum time of continuous transmission thereof, including charging circuit energized from transmitter power supply and having capacitor charged through high resistances, with threshold discharge device, such as neon tube, conducting in response to predetermined charge voltage to actuate transistor control circuit. The control circuit operates to de-energize the transmitter, as by disabling the power supply. The power supply includes a transistor interruptor, saturable transformer, rectifiers and a filter, and by grounding the filter the circuit is disabled. The bias may also be removed from the interruptor transistors to disable the power supply. The control circuit further actuates the audio section of the receiver to provide a signal indicating that transmission is terminated.

Figure 1:
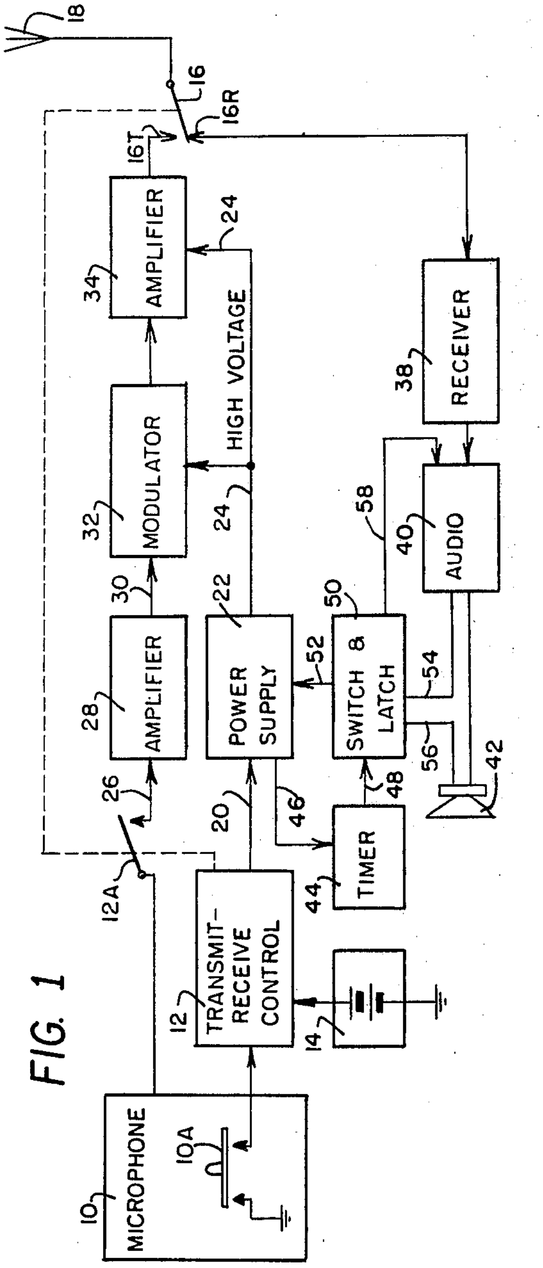

This invention relates to transmitters which produce a carrier signal and controls therefor and particular to transmitters sharing a transmission path with other transmitters.

In single-path radio or wire networks having a plurality of transmitters, only one transmitter may emit signals at any given time. In transmitters utilizing AC carrier signals the transmission of such AC carrier, with or without modulation, prevents other transmitters from using the network. The carrier signal transmission indicates a transmitter has been actuated for transmission. In single-path wire networks utilizing keyed DC current, a transmitter, such as a transmitter-distributor, indicates to a wire network that it is ready to transmit by supplying a current to the line. The term "carrier" or "carrier signal" as used herein is intended to include all types of transmission indicating signals usable in communication networks.

In the event a transmitter becomes permanently keyed, such that a carrier signal is continuously transmitted, the network becomes unuseable. Further, one transmitter by continuously transmitting may tie up the network preventing other transmitters from transmitting. It is therefore desired to limit the time a transmitter may continuously emit a carrier or a DC transmission indicating signal.

Accordingly, it is an object of this invention to provide controls in a transmitter which block or otherwise inhibit emission of transmission indicating signals after a predetermined time of continuous transmission.

It is another object of this invention in combination with the immediately preceding object to provide an operator indicating signal when the transmitter has exceeded the permitted continuous transmission time.

It is another object of this invention to provide a transmitter control for time limiting continuous transmission which rapidly turns the transmitter power supply off when the permitted time has been exceeded.

According to this invention, the transmitter and its control is provided with a timing unit which measures the time elapsed since a continuously provided transmitter carrier signal generating voltage has been supplied to the transmitter. After a predetermined time the timing unit actuates an electroresponsive switch to an active condition. The power supply responds to the active condition by removing the supplied voltage.

The timer actuated electroresponsive switch also is connected to the radio receiver portion of a transceiver such that when the switch is in its active condition, the audio portion of the receiver is reconnected as an oscillator for driving the speaker generating a tone which indicates the carrier has been turned off.

During normal operation the timer will never actuate the electroresponsive switch. Therefore there is provided means such that when the transmission is ended the timer is reset for permitting subsequent time periods of continuous transmission which are equal in all cases.

Figure 2:
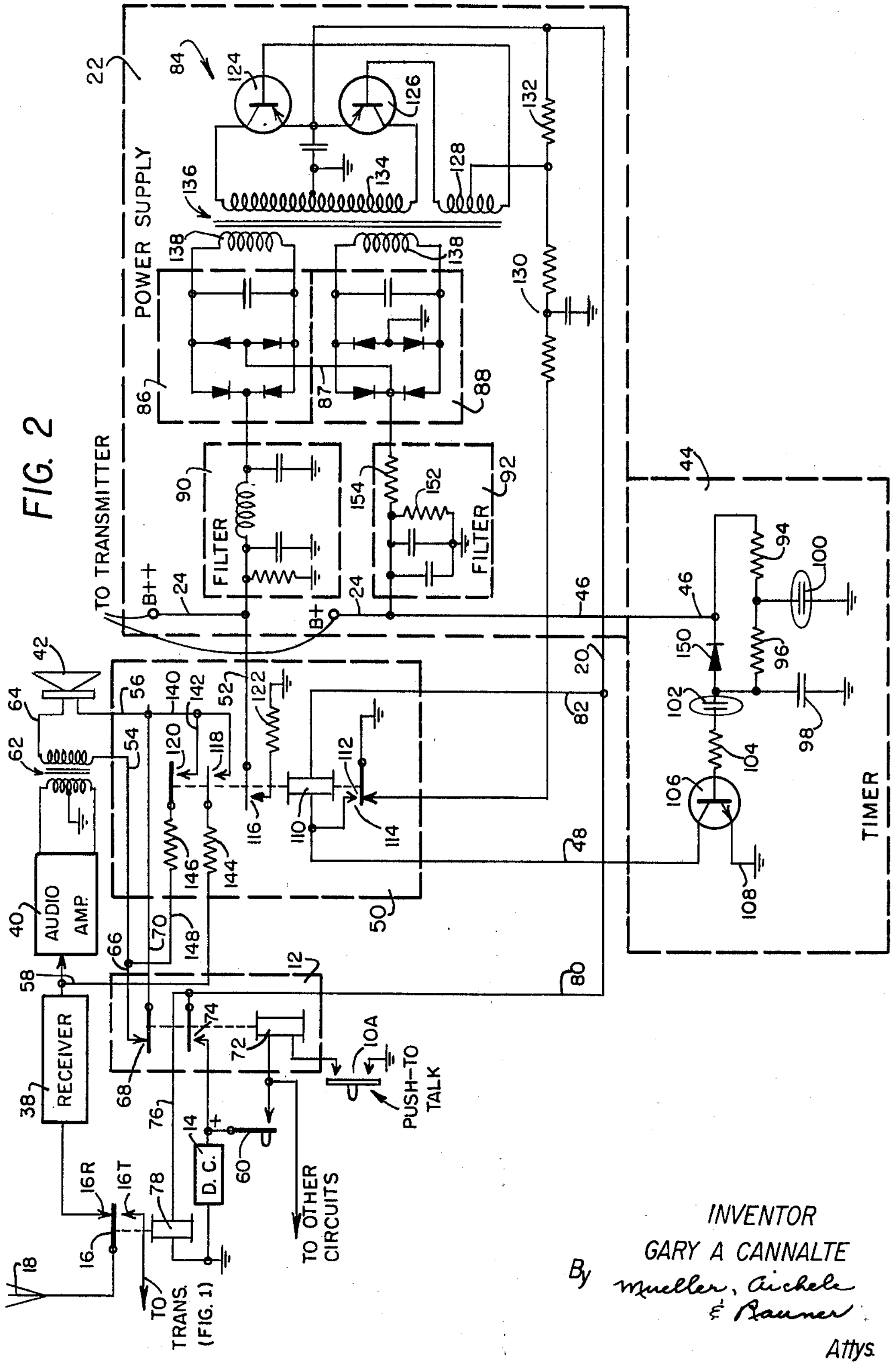

Referring now to the accompanying drawing:

FIG. 1 is a block diagram of a transceiver incorporating the teachings of the present invention; and FIG. 2 is an abbreviated schematic diagram of selected portions of the FIG. 1 illustrated transceiver system.

A transmitter having a power supply providing high tension or high voltage to a carrier signal section of the transmitter is of the self-protecting type. That is, when the load portion of the power supply is short circuited, or excessive current is drawn, the power supply includes a high-voltage generating transistorized astable switching circuit which saturates such that the output voltage is substantially reduced for preventing damage to the power supply. Other forms of saturable power supplies may be used, such as magnetic oscillators. Receiving a portion of the provided high voltage is an RC circuit having a long time constant. The state of charge of the RC circuit capacitor is indicative of the time that the power supply has continuously supplied high voltage for enabling carrier transmission. By selecting a neon tube connected to the capacitor, the breakdown voltage of the neon tube will provide a voltage analog of the time limit imposed upon transmitter continuous transmission. When the capacitor voltage exceeds the neon tube breakdown voltage, a pulse is formed which biases a transistor into current conduction for actuating an electromechanical relay. The relay switches in an extremely low impedance to the output portion of the power supply for saturating the astable circuit. Additionally and simultaneously the relay alters the circuit biasing astable circuit transistors such that the transistors are biased to current non-conduction for doubly ensuring that the power supply provides no output voltage to the carrier signal section of the transmitter.

The electromechanical relay also has additional sets of contacts for reconnecting the audio amplifier portion of a receiver as an oscillator. The reconnected circuit includes the receiver speaker for providing a tone indication to the operator that the time limit for continuous transmission has been exceeded and that the transmitter has been deactivated even though the operator may still be calling for a transmission.

In referring to FIGS. 1 and 2, like numbers indicate like parts and structural features. Microphone 10 having a push-to-talk switch 10A is connected to transmit-receive control 12. A battery or other power source 14 supplies unregulated electrical energy to control 12. Upon closure of switch 10A, transmit-receive control 12 closes switch 12A for connecting microphone 10 to amplifier 28 and simultaneously sets antenna switch 16 to terminal 16T connecting antenna 18 to the transmitter. The unregulated energy from source 14 is transferred over line 20 to power supply 22 which generates and regulates the transmitter high voltage supplied to the transmitter over lines 24.

Microphone 10 supplies audio signals over line 26 to audio amplifier 28. The amplified audio signals are provided over line 30 to modulator 32. In this diagram, modulator 32 is intended to include the carrier frequency oscillator, any frequency multipliers, intermediate frequency amplifier stages, and AFC and AGC circuits. Output amplifier 34 takes the modulator 32 carrier signal, either modulated or unmodulated, and supplies the amplified signal to switch 16 for transmission over antenna 18.

Upon release of push-to-talk switch 10A, antenna switch 16 automatically resets to terminal 16R. Signals intercepted by antenna 18 are then provided over line 36 to receiver 38. Audio amplifier section 40 takes the detected signals from receiver 38 and supplies detected and amplified audio signals to speaker 42 or other audio output transducer.

To provide a time limitation on a continuous carrier emission over antenna 18, timer 44 receives an indication from power supply 22 over line 46 that the carrier signal section of the transmitter is activated by a voltage over line 24. This time limit also provides protection against transmitter failures which keep the high voltage on, such as relay contacts becoming welded together. As used herein, the term "carrier signal section" of a transmitter is intended to include the circuits directly associated with generation, amplification and emission of a carrier signal, such as circuits represented by modulator 32, output amplifier 34, antenna switch 16 and antenna 18 plus that portion of power supply 22 providing a voltage over lines 24. It is understood that the power supply 22 may provide other voltages for operation of other circuits within the transmitter and the receiver, no limitation thereto being intended.

Upon expiration of the predetermined time limit on the transmitter for continuously supplying carrier signal activating voltage, timer 44 provides an impulse over line 48 actuating switch 50 which has a latch circuit for holding the switch in its active condition. Switch 50 is connected by line 52 to power supply 22 for quickly deactivating power supply 22 upon receipt of a pulse from line 48. Upon removal of the voltage from lines 24, the transmitter carrier signal section is made inoperative. Upon release of push-to-talk switch 10A, which releases the transmit-receive control 12 removing the source 14 unregulated electrical energy from the transmitter, switch 50 is released and timer 44 is reset. Simultaneously therewith switch 12 is opened and antenna switch 16 is set to terminal 16R.

An audio indication of the expiration of the predetermined time limit is provided by connections 54, 56 and 58 between switch 50, audio section 40 and speaker 42. In normal operation, lines 54 and 56 connect speaker 42 to audio section 40. Upon receipt of the pulse on line 48 switch 50 disconnects line 54 from 56 and reconnects line 54 to line 58 through a suitable resistance for making audio section 40 oscillate. The oscillations are provided over line 56 to speaker 42 which converts such oscillations into a tone, indicating expiration of the time limit.

Paying particular attention now to FIG. 2, the illustrated transmitter-receiver has the usual on-off switch 60 for selectively connecting energy source 14 to transmit-receive control 12. When push-to-talk switch 10A is in the illustrated position antenna 18 is connected through switch 16 to receiver 38. Audio section 40 is connected through the usual output transformer 62 to speaker 42 as over line 64. The circuit is completed from output transformer 62 over lines 54 and 56 through normally closed contacts 68. Lines 66 and 70 connect contacts 68 respectively to lines 54 and 56.

The transmitter is actuated by closing push-to-talk switch 10A which energizes coil 72 in TR control 12. Energized coil 72 opens normally-closed contacts 68 disconnecting speaker 42 from the receiver. It also closes normally-open contacts 74 connecting source 14 over line 76 to antenna switch coil 78. Coil 78 sets switch 16 to terminal 16T connecting antenna 18 to the FIG. 1 illustrated transmitter. Source 14 is also connected over line 80 and thence line 20 to power supply 22. Only that portion of supply 22 which supplies the transmitter carrier signal section high voltage is illustrated. Line 82 connects line 80 to switch 50 for supplying unregulated electrical power thereto. Having described the energy connections provided by control 12, the operation of the transmitter will be described.

Power supply 22 operation is first described. Source 14 voltage provided over line 20 actuates transistorized astable circuit 84 to provide stepped-up alternating voltages to full-wave rectifiers 86 and 88. The rectified voltages are respectively passed through filters 90 and 92 to the lines 24 for transmission to the carrier signal section of the FIG. 1 transmitter. Full-wave rectifiers 86 and 88 are interconnected by line 87 such that the output of rectifier 86 will be at a higher potential with respect to ground reference potential than the output of rectifier 88.

To actuate timer 44, filter 92 output voltage is supplied to line 46. In timer 44, such voltage is passed through a high impedance circuit including resistors 94 and 96 for charging capacitor 98. The time constant of the resistors 94 and 96 and capacitor 98 determines the time limit of continuous carrier signal generation, amplification and emission from the transmitter carrier signal section. For improved time measurement accuracy the charging voltage is regulated as by neon tube 100 connected to the junction of resistors 94 and 96. As capacitor 98 is charged, the threshold of neon tube 102 is reached and exceeded causing it to discharge, producing a pulse. The pulse is supplied through base resistor 104 to forward bias transistor 106. Transistor 106 has its emitter grounded as at 108. The low impedance path of transistor 106 when forward biased is connected over line 48 to relay coil 110 of switch 50. The circuit energizing coil 110 is completed by the line 82 connection to source 14 through closed contacts 74 (control 12). Coil 110 is latched to the energized position by arm 112 moving to contact 114 which serves to ground line 48.

In switch 50, normally open contacts 116 are closed by coil 110 for connecting low impedance 122 to line 52 for removing the supply 22 voltages as will be later described. Further normally-open contacts 118 and 120 are closed for generating an audio tone as will be also later described.

The effect of resistor 122 on supply 22 is now described. The impedance of resistor 122 is sufficiently low to overload power supply 22. Transistorized astable circuit 84 is constructed such that when the power supply is overloaded, the transformer 136 saturates which deactivates circuit 84 for quickly removing the supplied voltage.

In normal operation of circuit 84, the unregulated voltage over line 20 provides initial base drive through resistor 132 and the resistance of RC circuit 130, which has one end connected to ground reference potential through switch arm 112 (when coil 110 in switch 50 is not energized). The divided voltage is provided through secondary windings 128 to the base electrodes of transistors 124 and 126. The transistors usually will have different characteristics so that one will start conducting more quickly than the other causing current to flow through primary winding 134 of step-up transformer 136. As current flows through one section of primary 134, a voltage is induced in winding 128 for initiating oscillatory action between the conductive states of transistors 124 and 126. Such oscillations or vibrations are transformed to secondary windings 138 which are connected to the full wave rectifiers 86 and 88 for providing rectified high voltage for the carrier signal section of the transmitter.

In turning off supply 22, the saturation of transformer 136 removes the above described induced base drive voltage in windings 128. The transistors 124 and 126 output signals are then reduced further reducing the base drive resulting in substantially removing the output voltage from filters 90 and 92.

In addition to the power supply being turned off by its automatic self-protection characteristics by connecting low impedance 122 to an output connection of a supply voltage, the base drive of transistors 124 and 126 is removed by setting switch arm 112 to terminal 114. This action disconnects the resistance-capacitance circuit 130 from ground reference potential and connects the full source 14 voltage directly through resistor 132 and secondary winding 128 to the base electrodes of transistors 124 and 126 to reverse bias both transistors to current non-conduction. Therefore, two actions are provided simultaneously for ensuring that the carrier signal is suppressed after the predetermined time limit has expired.

The audio tone indication that the time limit has expired is provided by connecting audio section 40 through contacts 118 and 120 of switch 50 to provide tone oscillations to speaker 42. Under normal receiving operations, normally closed contacts 68 of control 12 connect lines 54 and 56 for coupling speaker 42 directly to the output transformer 62 secondary winding. When control 12 is actuated by the push-to-talk switch 10A, contacts 68 are opened. The audio tone signal is transferred from transformer 62 to speaker 42 by a circuit including line 64 on one side with the circuit other side being completed by line 54 from transformer 62 being connected over line 148, resistor 146, through closed contacts 120, over line 142 then lines 140 and 56 to speaker 42. Resistor 146 preferably has the same impedance as speaker 42.

The tone generation circuit (output of a section 40 connected to the input) is formed by closing contacts 118 which has its movable arm connected through resistor 144 and over line 58 to an input connection of audio section 40. The other terminal of contacts 118 is connected to lines 56 and 142 over line 140 of the above described audio output connections. The tone generation circuit is completed from the audio section output to contacts 118 through output transformer 62 and thence over two parallel paths; one path being over line 64, through speaker 42, line 56, and line 140 to contacts 118; the other parallel path being from transformer 62 over line 54, line 148, resistor 146, closed contacts 120 and line 142 to closed contacts 118. Resistor 146 has a substantially higher impedance than the parallel path including speaker 42, therefore the opposing voltages over the parallel paths will be dominated by the speaker 42 path signals at contacts 118. An amplifier such as the audio section 40 having its output connected to the input will oscillate at a predetermined frequency for generating a tone, as it is well known in art. Speaker 42 is serially connected in such tone generation circuit and additionally is connected in the above described output loop connected to the transformer 62 secondary winding.

The opening of push-to-talk switch 10A automatically resets timer 44, releases switch 50 and enables power supply 22 to again supply power to the transmitter carrier signal section upon a reclosure of switch 10A. Opening switch 10A de-energizes coil 72 of control 12 opening contacts 74. The voltage from source 14 is removed from lines 76 and 80 releasing the antenna switch 16 permitting it to reset to terminal 16R, removes all energy from power supply 22 and from coil 110 of switch 50 releasing all contacts therein.

Normal operation of the illustrate transmitter includes opening push-to-talk switch 10A before the expiration of the predetermined time limit. In such case the release of the switch 10A resets timer 44 by discharging capacitor 98. Capcitor 98 upon the opening of the switch 10A, discharges through diode 150 over line 46, through filter 92, resistances 152 and 154 to ground. It should be noted that the time constant provided by the latter described circuit is small such that capacitor 98 rapidly discharges. The time constant provided in the charging circuit including resistors 94 and 96 is relatively long with respect to the time constant of filter 92. Diode 150 is reversed biased whenever filter 92 is supplying its voltage.

The system described has been found to be effective to prevent undesired long transmissions which would tie up a communication network. The operator is alerted to the termination of the transmission so that he can take proper action if a message is interrupted.

What is claimed is:

1. A control system for use with a radio transmitter having a carrier signal section and a power supply portion for supplying an operating voltage to the carrier signal section, and wherein the power supply portion is rendered active to initiate a transmission, such control system including in combination, a resistance-capacitance timing circuit coupled to the power supply and receiving a voltage therefrom in response to the activation thereof, said timing circuit including capacitor means and resistor means connected in series, with said resistor means controlling the current applied to said capacitor means to develop a predetermined voltage thereacross at a predetermined time interval after activation of the power supply a voltage responsive discharge device coupled to said timing circuit and responsive to said predetermined voltage to discharge said voltage responsive discharge device to produce a current pulse, current responsive switch means coupled to said voltage responsive discharge device and operative in response to the current pulse produced by the discharge thereof, control means coupled to said switch means and to the power supply and responsive to operation of said switch means to deactivate the power supply to remove operating voltage from said transmitter carrier signal section to limit the transmission from the carrier signal section to such predetermined time interval, and current conduction means connecting said capacitor means of said timing circuit to the power supply portion and rendered operative in response to deactivation of the power supply portion to discharge said capacitor means.

2. The combination of claim 1 wherein said timing circuit includes voltage regulator means for controlling the potential applied to the series circuit including said capacitor means and said resistor means.

3. The combination of claim 1 wherein said voltage responsive discharge device is a neon-type discharge tube.

4. The combination of claim 1 wherein said current conduction means is a diode.

5. A transmitter including in combination, a carrier signal section, a power supply portion for supplying an operating voltage to the carrier signal section, said power supply portion being selectively rendered active to initiate a transmission and including filter means which has a given time constant across which the operating voltage is developed when the power supply portion is activated, a timing circuit coupled to said power supply filter means for receiving the voltage therefrom, said timing circuit including a capacitor and a resistor for providing current to said capacitor in response to activation of said power supply portion, with said capacitor and said resistor having values providing a charging time constant greater than said given time constant of said filter means, a voltage responsive discharge device coupled to said timing circuit and having a threshold to provide a discharge at a predetermined voltage, current responsive switch means coupled to said voltage responsive discharge device and operative in response to current therefrom, said voltage responsive discharge device applying a pulse of current to said switch means to operate the same in response to the application of said predetermined voltage to said voltage responsive discharge device, control means coupled to said switch means and to said power supply portion and responsive to operation of said switch means to deactivate said power supply portion to remove the operating voltage from said filter means thereof, and current conduction means connecting said capacitor to said filter means and rendered operative in response to deactivation of said power supply portion to discharge said capacitor through said filter means.

6. The combination of claim 5 wherein said filter means includes resistor means through which said capacitor discharges in response to deactivation of said power supply portion, with the discharge time constant being substantially smaller than the charging time constant.

References Cited

UNITED STATES PATENTS

| | | | |
|---|---|---|---|
| 2,766,324 | 10/1956 | Peth | 325—57 |
| 3,117,279 | 1/1964 | Ludvigson | 325—133 |
| 3,210,665 | 10/1965 | Street | 325—64 |
| 3,217,255 | 11/1965 | Broadhead | 325—64 |
| 3,292,085 | 12/1966 | Black | 325—64 |
| 3,304,501 | 2/1967 | Ruthenberg | 325—64 |
| 3,330,907 | 7/1967 | Arimura. | |
| 3,317,789 | 5/1967 | Nuckolls | 307—252 |

OTHER REFERENCES

On the Air with Single Sideband, QST, May 1953, p. 44.

ROBERT L. GRIFFIN, Primary Examiner

ALBERT J. MAYER, Assistant Examiner

U.S. Cl. X.R.

325—57, 64, 166, 169, 187, 189